United States Patent
Glova et al.

(10) Patent No.: US 7,582,272 B2
(45) Date of Patent: Sep. 1, 2009

(54) METHOD OF TREATING A CATALYTIC REACTOR SYSTEM PRIOR TO REACTOR SERVICING

(75) Inventors: David J. Glova, Kingwood, TX (US); Tin-Tack Peter Cheung, Kingwood, TX (US); Dan B. Knorr, Humble, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 889 days.

(21) Appl. No.: 10/799,987

(22) Filed: Mar. 12, 2004

(65) Prior Publication Data

US 2005/0203328 A1 Sep. 15, 2005

(51) Int. Cl.
*B01D 53/72* (2006.01)
(52) U.S. Cl. .................................. 423/245.3; 502/52
(58) Field of Classification Search .................. 502/38, 502/51, 52; 423/245.1, 245.3
See application file for complete search history.

(56) References Cited

U.S. PATENT DOCUMENTS

| | | | |
|---|---|---|---|
| 2,882,244 A | 4/1959 | Milton | 252/455 |
| 3,130,007 A | 4/1964 | Breck | 23/113 |
| 3,216,789 A | 11/1965 | Breck et al. | 23/113 |
| 4,021,447 A | 5/1977 | Rubin et al. | 260/326.8 |
| 4,071,439 A | 1/1978 | Yanik et al. | |
| 4,503,023 A | 3/1985 | Breck et al. | 423/328 |
| 4,539,304 A | 9/1985 | Field | 502/66 |
| 4,539,305 A | 9/1985 | Wilson et al. | 502/66 |
| 4,937,215 A | 6/1990 | Murakawa et al. | |
| 5,073,529 A | 12/1991 | Miller et al. | |
| 5,155,075 A | 10/1992 | Innes et al. | 502/52 |
| 5,723,707 A | 3/1998 | Heyse et al. | 585/444 |
| 5,863,418 A | 1/1999 | Heyse et al. | 208/135 |
| 5,883,031 A | 3/1999 | Innes et al. | 502/38 |
| 5,895,636 A * | 4/1999 | Nguyen et al. | 423/245.1 |
| 6,207,120 B1 * | 3/2001 | Belmonte et al. | 423/210 |
| 6,812,180 B2 | 11/2004 | Fukunaga | |
| 7,153,801 B2 | 12/2006 | Wu | |

FOREIGN PATENT DOCUMENTS

EP 0498187 B1 8/1992
WO WO 92/15654 9/1992

OTHER PUBLICATIONS

International Search Report and Written Opinion of the International Searching Authority, PCT/US2005/008028, Oct. 3, 2005, 11 pgs.
Schneider, D.F., "Improve catalyst removal methods," Hydrocarbon Processing, Oct. 2000, 4 pgs.
Stamey, D.J., "Inert entry cuts delay, solves catalyst problems," the Oil and Gas Journal, Mar. 28, 1977, pp. 64-68.
Logan Jr., H.H., "Catforming at United Refining Company," Petroleum Refiner- Process Issue '55—18th Annual, vol. 34, No. 9, Sep. 1955, pp. 169-173.
Patent application entitled "Extending the life of an aromatization catalyst" by Scott H. Brown, filed on Nov. 14, 2007 as U.S. Appl. No. 11/940,115.
CP Chem Editorial (Benzene), "Statement of Commitment to Responsible Care®," Jun. 2003, 28 pgs.

* cited by examiner

*Primary Examiner*—Edward M Johnson
(74) *Attorney, Agent, or Firm*—Conley Rose P.C.; Rodney B. Carroll; Daniel E. Burke (57) ABSTRACT

A method of servicing a catalytic reactor system, comprising an abatement of at least one hazardous substance from the catalytic reactor system while preserving activity of a catalyst contained therein. A method of servicing a catalytic reactor system, comprising oxidizing the catalytic reactor system at a temperature of from about 350° F. to about 500° F. to abate at least one hazardous substance from the catalytic reactor system and reducing servicing time by about 50% of a time required for complete regenerative oxidation of the catalytic reactor system. A method of servicing a catalytic reactor system, comprising abating at least one hazardous substance from the catalytic reactor system such that a fouling rate of a catalyst contained therein is substantially the same before and after the servicing.

33 Claims, 3 Drawing Sheets

METHOD OF TREATING A CATALYTIC REACTOR SYSTEM PRIOR TO REACTOR SERVICING

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to catalytic reactions such as catalytic reforming and processing equipment associated with catalytic reforming. More specifically, the invention relates to the abatement of at least one hazardous substance from a catalytic reactor system prior to servicing of the catalytic reactor system while preserving activity of the catalyst contained therein.

BACKGROUND OF THE INVENTION

Catalyzed reactions and associated catalytic reactor systems are widely used in a variety of industries. A catalyst typically has a finite performance life, which may include one or more cycles of catalyst activity separated by regeneration cycles. For example, as a catalytic process continues over time, the catalyst activity generally decreases. When the catalyst activity reaches a point at which it no longer efficiently catalyzes the process, the catalyst may be at the end of its life or at the end of one of its cycles of catalyst activity. If the catalyst has one or more cycles of catalyst activity remaining, the catalyst can be regenerated to begin a new cycle of catalyst activity. If no additional cycles are available, the catalyst life is spent, and the spent catalyst typically will need to be replaced with fresh catalyst.

Figure 1:
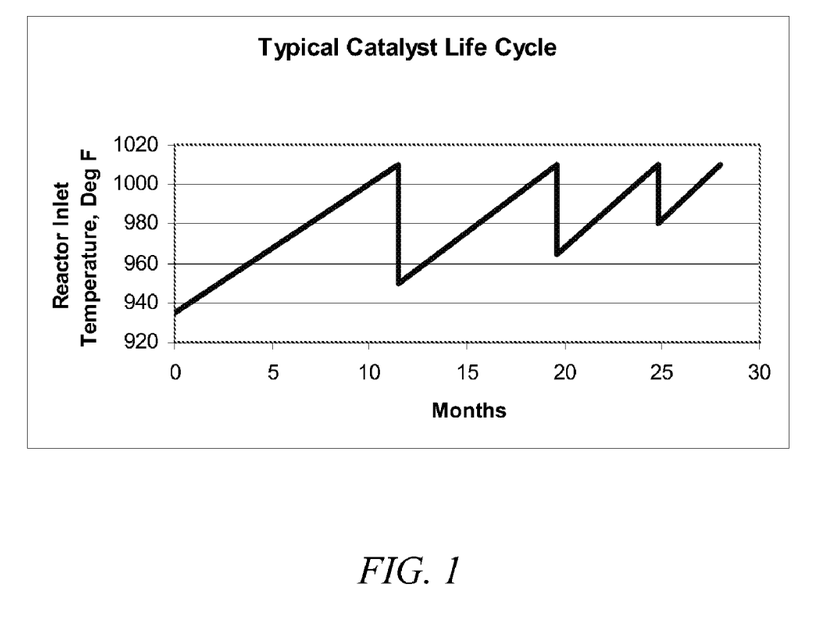
FIG. 1 is a hypothetical illustration of a typical catalyst life cycle for a catalytic reactor system.

FIG. 1 is a hypothetical graph illustrating a general catalyst life cycle for a catalyst having 4 activity cycles and 4 regeneration cycles. The first activity cycle begins a time zero and lasts for many months, and during this cycle the activity of the catalyst decreases as evidenced by an increase in the reactor inlet temperature (as described in more detail herein). The slope of the line represents the fouling rate of the catalyst, i.e., the change in activity over a given period of service time. The reactor inlet temperature continues to increase until it reaches a maximum value (e.g., greater than 1000° F. in FIG. 2), at which time the catalyst may be regenerated (e.g., a regeneration cycle), for example by subjecting the catalyst to a high temperature oxidation (e.g. greater than about 600° F.) to remove carbon build-up such as coking. During this process coke may be removed from the catalytic reactor system, and the catalyst contained therein. The regeneration of the catalytic reactor system provides renewed activity to the catalyst (e.g., a new activity cycle) as evidenced by a lower reactor inlet temperature, which is shown by the vertical drops or decreasing steps in the graph. However, when a new cycle is started, the starting reactor inlet temperature is typically higher than for the previous cycle (as shown by the progressively increasing reactor inlet temperature at the start of each new cycle), representing an unrestored loss in overall catalyst activity. Because the catalyst activity is not fully restored after each cycle, the catalyst life is limited by a maximum number of regeneration cycles, for example four as shown in FIG. 1. Furthermore, with each regeneration cycle, the fouling rate (slope) of the catalyst may increase. Thus, regeneration of a catalytic reactor system may also increase the catalyst fouling rate, which would further reduce the total life of a catalyst.

The catalytic reactor system may require service for a variety of reasons which may occur at various points throughout the catalyst life cycle. In preparation for servicing, any hazardous substances present in the reactor system need to be abated to a safe exposure level such that the reactor system may be opened for service. Typically, a catalytic reactor system regeneration procedure is performed to abate the hazardous substances to a safe exposure level, and subsequently a new catalyst activity cycle is begun after the servicing. When a shut down is necessary at a time prior to the end of a catalyst's life or one of its cycles, useable catalyst activity is lost during the regeneration. Therefore, a need exists for methods of abating hazardous substances to a safe exposure level for servicing a catalytic reactor system that can preserve catalyst activity and thereby improve overall plant economics.

SUMMARY OF THE INVENTION

Disclosed herein is a method of servicing a catalytic reactor system, comprising an abatement of at least one hazardous substance from the catalytic reactor system while preserving activity of a catalyst contained therein.

Also disclosed herein is a method of servicing a catalytic reactor system, comprising oxidizing the catalytic reactor system at a temperature of from about 350° F. to about 500° F. to abate at least one hazardous substance from the catalytic reactor system and reducing servicing time by about 50% of a time required for complete regenerative oxidation of the catalytic reactor system.

Also disclosed herein is a method of servicing a catalytic reactor system, comprising abating at least one hazardous substance from the catalytic reactor system such that a fouling rate of a catalyst contained therein is substantially the same before and after the servicing.

Also disclosed herein is a method of controlling an oxidation procedure in a catalytic reactor system, comprising: oxidizing the catalytic reactor system at a temperature of from about 350° F. to about 500° F.; monitoring abatement of at least one hazardous substance within the catalytic reactor system; and controlling the oxidation in response to the monitoring such that activity of a catalyst contained therein is preserved and the at least one hazardous substance is oxidized to a safe exposure level.

DETAILED DESCRIPTION OF THE PREFERRED EMBODIMENTS

The present disclosure includes a method of servicing a catalytic reactor system, comprising abating at least one hazardous substance from a catalytic reactor system while preserving activity of a catalyst contained therein. The method disclosed may be useful in any suitable catalytic reactor system. However, the following detailed description is focused primarily on embodiments for servicing a catalytic reforming process, with the understanding that the disclosure has broader applications and is not limited to reforming processes.

In various embodiments, the catalytic reactor system may comprise a fixed bed system, a moving bed system, a fluidized bed system, or combinations thereof. Such reactor systems may be batch or continuous. In an embodiment, the catalytic reactor system is a fixed bed system comprising one or more fixed bed reactors. In a fixed bed system, the feed may be preheated in furnace tubes and passed into at least one reactor that contains a fixed bed of the catalyst. The flow of the feed can be upward, downward, or radial through the reactor. "Catalytic reactor" and "reactor" as used herein refer interchangeably to the reactor vessel, reactor internals, and associated processing equipment, including but not limited to the catalyst, inert packing materials, scallops, flow distributors, center pipes, reactor ports, catalyst transfer and distribution system, furnace means, heat transfer means, and piping.

In an embodiment, the catalytic reactor system is a reforming reactor system comprising at least one reforming reactor and its corresponding processing equipment. In an embodiment, the reforming reactor system comprises a plurality of reforming reactors in series. As the reaction within each reactor is endothermic, a large temperature drop may occur. Therefore, each reactor in the series may comprise a corresponding furnace for reheating components back to a desired temperature for maintaining a desired reaction rate. Alternatively, one or more reactors may share a common furnace where practical.

Figure 2:
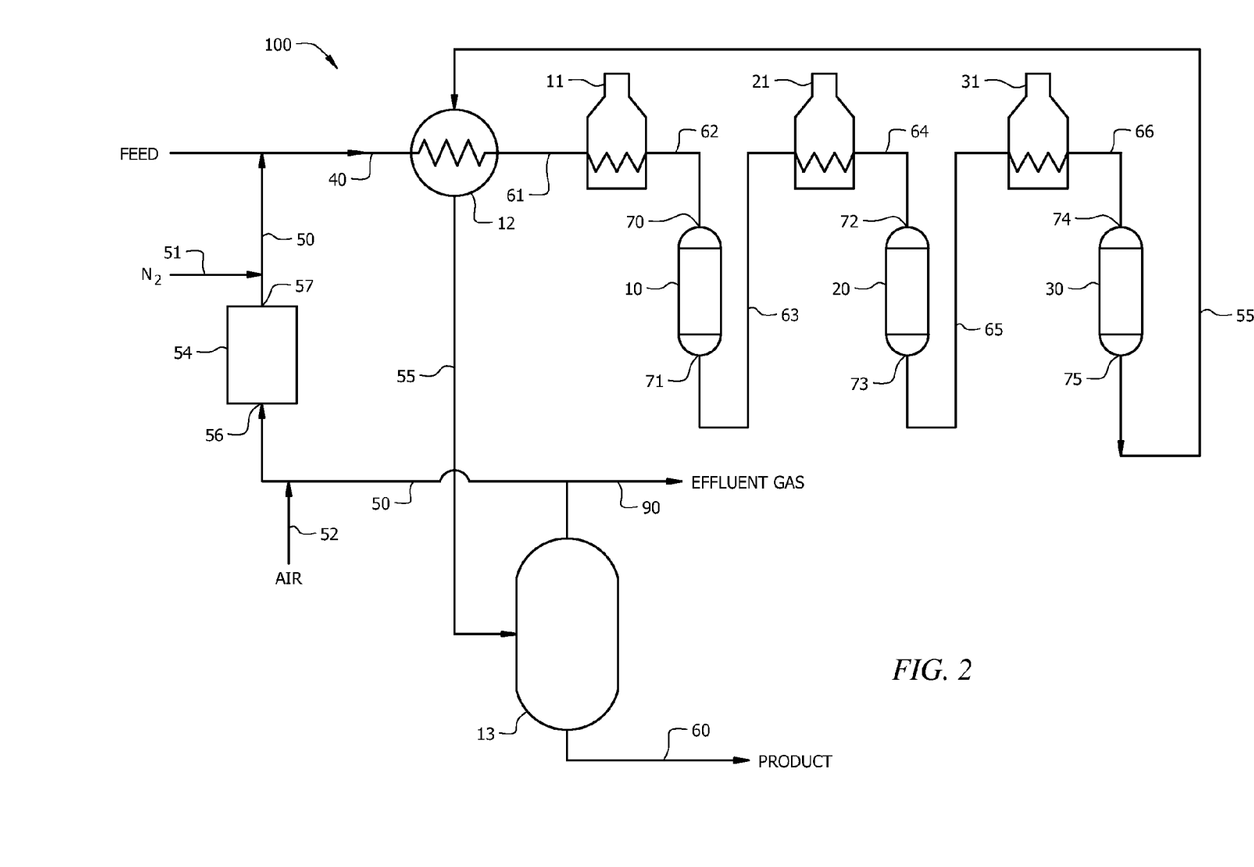
FIG. 2 is an illustration of a suitable catalytic reactor system for use with the present invention.

FIG. 2 illustrates a reforming reactor system embodiment referred to hereinafter as catalytic reactor system 100. The catalytic reactor system 100 may comprise any suitable number of reforming reactors. In the embodiment shown in FIG. 2, the catalytic reactor system 100 comprises 3 reforming reactors in series: reactors 10, 20, and 30. In alternative embodiments, the catalytic reactor system comprises 1, 2, 4, 5, 6, or more reactors in series. In FIG. 2, feed may enter the catalytic reactor system 100 via feed line 40, which connects to heat exchanger 12 for preheating the feed and passing the preheated feed to the first reactor furnace 11 via line 61. Furnace 11 is provided for heating the feed to a desired temperature. Furnace 11 is connected to first reactor 10 by line 62, and the feed is introduced into reactor 10 via inlet 70. Within reactor 10, the feed is contacted with a catalyst under suitable reaction conditions (e.g., temperature and pressure) for reforming one or more components in the feed to increase the aromatics content thereof.

Catalytic reactor system 100 further comprises furnace 21, connected to the outlet 71 of reactor 10 by line 63, to reheat the feed (including reaction products from reactor 10 and unreacted components) to a desired temperature. Furnace 21 is connected to second reactor 20 by line 64, and the feed is introduced into reactor 20 via inlet 72. Within reactor 20, the feed is contacted with a reforming catalyst under suitable reaction conditions (e.g., temperature and pressure) for reforming one or more unreacted components in the feed to further increase the aromatics content thereof.

Catalytic reactor system 100 further comprises furnace 31, connected to the outlet 73 of reactor 20 by line 65, to reheat the feed (including reaction products from reactor 10 and 20 and unreacted components) to a desired temperature. Furnace 31 is connected with third reactor 30 by line 66, and the feed is introduced via inlet 74. Within reactor 30, the feed is contacted with a reforming catalyst under suitable reaction conditions (e.g., temperature and pressure) for reforming one or more unreacted components in the feed to further increase the aromatics content thereof. The reactor system effluent stream 55 connects the outlet 75 of last reactor 30 to heat exchanger 12. Heat exchanger 12 cools the effluent (and preheats the feed), which is conveyed to separator 13 for separating out a product stream via line 60, an effluent gas stream via line 90, and a recycle stream via recycle line 50. Line 50 connects back into line 40 to pass recycled components back through catalytic reactor system 100 to allow for further processing of the recycled components.

"Reforming" as used herein refers to the treatment of a hydrocarbon feed to provide an aromatics enriched product (i.e., a product whose aromatics content is greater than in the feed). Typically, one or more components of the feed undergo one or more reforming reactions to produce aromatics. Some of the hydrocarbon reactions that occur during the reforming operation include the dehydrogenation of cyclohexanes to aromatics, dehydroisomerization of alkylcyclopentanes to aromatics, and dehydrocyclization of acyclic hydrocarbons to aromatics. A number of other reactions also occur, including the dealkylation of alkylbenzenes, isomerization of paraffins, and hydrocracking reactions which produce light gaseous hydrocarbons, e.g., methane, ethane, propane and butane.

In an embodiment, naphtha is reformed to form aromatics. The naphtha feed may be a light hydrocarbon, with a boiling range of about 70° F. to 450° F. The naphtha feed may contain aliphatic or paraffinic hydrocarbons. These aliphatics are converted, at least in part, to aromatics in the reforming reactor system. In an embodiment, the feed is substantially free of sulfur, nitrogen, metals, and other known catalyst poisons. These catalyst poisons can be removed by first using conventional hydrofining techniques, then using sorbents to remove the remaining sulfur compounds. While catalytic reforming typically refers to the conversion of naphtha, other feedstocks can be treated as well to provide an aromatics enriched product. Therefore, while the conversion of naphtha is one embodiment, the present disclosure can be useful for servicing reactor systems for the conversion or aromatization of a variety of feedstocks such as paraffin hydrocarbons, olefin hydrocarbons, acetylene hydrocarbons, cyclic paraffin hydrocarbons, cyclic olefin hydrocarbons, and mixtures thereof, and particularly saturated hydrocarbons.

Operating ranges for a typical reforming process include reactor inlet temperatures between 700° and 1050° F.; a system pressure between 0 and 400 psig; a recycle hydrogen rate sufficient to yield a hydrogen to hydrocarbon mole ratio for the feed to the reforming reactor zone between 0.1 and 20; and a liquid hourly space velocity for the hydrocarbon feed over the reforming catalyst of between 0.1 and 10. Suitable reforming temperatures are achieved by heating the furnace tubes to high temperatures that can range from 600° to 1800° F.

The present disclosure may be useful for servicing any catalytic reactor system. In particular, this disclosure may be useful for servicing a reforming catalytic reactor system and may use a variety of different reforming catalysts. The reforming catalyst may be any reforming catalyst, for example, Noble Group VIII metals on refractory inorganic oxides such as platinum on alumina, Pt/Sn on alumina and Pt/Re on alumina; Noble Group VIII metals on a zeolite such as Pt, Pt/Sn and Pt/Re on zeolites such as L-zeolites, ZSM-5, silicalite and beta; and Noble Group VIII metals on alkali- and alkaline-earth exchanged L-zeolites. The catalyst may be a large-pore zeolite charged with at least one Group VIII metal. In an embodiment, the Group VIII metal may be platinum, which may be more selective for dehydrocyclization and which may be more stable under reforming reaction conditions than other Group VIII metals. In an embodiment, the catalyst may contain between 0.1% and 5% platinum of the weight of the catalyst.

The term "large-pore zeolite" is defined as a zeolite having an effective pore diameter of from 6 to 15 Angstroms. Examples of large pore zeolites are type L zeolite, Mazzite, Mordenite, zeolite X, and zeolite Y. Type L zeolite is described in U.S. Pat. No. 3,216,789. Zeolite X is described in U.S. Pat. No. 2,882,244. Mazzite is described in U.S. Pat. Nos. 4,503,023 and 4,021,447. Mordenite is described in U.S. Pat. No. 4,503,023. Zeolite Y is described in U.S. Pat. No. 3,130,007. U.S. Pat. Nos. 3,216,789; 2,882,244; 4,503,023; 4,021,447; and 3,130,007, are hereby incorporated by reference to show zeolites useful for reforming processes. In an embodiment, the zeolite is type L zeolite.

In a catalytic reactor system such as catalytic reactor system 100, many events may require shutting down and servicing of the system. Servicing a catalytic reactor system, e.g. a reforming reactor system, may become necessary for a variety of reasons and can occur at various points throughout the life cycle of a catalyst. For example, servicing may be required to inspect vessels, diagnose operational problems or repair various problems in a catalytic reactor system. Alternatively, servicing may be required to perform safety inspections of parts of the catalytic reactor system. Alternatively, servicing may be required due to a pressure build-up somewhere in the catalytic reactor system 100. The catalytic reactor system 100 can become plugged due to coking, as coking is a common problem in hydrocarbon processing. If the problem is not resolved when it occurs, flow is restricted and pressure may build, limiting production and eventually exceeding mechanical limitation of the equipment. Thus, coking may require cleaning the reactor internals and/or dumping and screening of the catalyst in one or more reactors to remove any build-up of coke or other material that may be causing the pressure build-up. Many other events may occur at various locations throughout the catalytic reactor system 100 requiring shutting down and servicing the catalytic reactor system 100. The servicing procedure of this disclosure may be used for any event that requires shutting down and servicing a catalytic reactor system except where full catalyst regeneration is desired. In an embodiment, servicing comprises dumping and screening the catalyst. In an embodiment, servicing comprises reloading the catalyst after servicing and subsequently starting-up the catalytic reactor system.

In an embodiment servicing comprises replacing a spent catalyst which includes shutting down and servicing the catalytic reactor system 100. At the point where the catalyst activity can no longer be regenerated to an economically usable amount, the catalyst may be removed from the reactor system and replaced with a fresh catalyst. Although activity and fouling rate may be of little or no concern since the spent catalyst is simply being removed to permit reclamation of the metals from the catalyst and will no longer be used in the catalytic reactor system 100, the method of this disclosure for servicing a catalytic reactor system may also be used to reduce energy costs, servicing time and reactor system down time.

In an embodiment, one or more hazardous substances are abated from the catalytic reactor system 100 in FIG. 2 so that it may be shut-down and safely serviced. In an embodiment, catalytic reactor system 100 having been in operation for a period of time may need to be serviced, for example due to a continuing pressure increase developing in the first reactor 10 of catalytic reactor system 100. In the embodiment, the catalyst in reactor 10, e.g., a platinum catalyst, may have been recently regenerated such that many more months of remaining catalyst activity are left in the current cycle. A shutdown may be scheduled for servicing the catalytic reactor system 100 to dump and screen the catalyst in the first reactor 10.

In an embodiment, the reactor system is shut down and the catalytic reactor system undergoes a low temperature oxidation of one or more hazardous substances before servicing the catalytic reactor system 100. The reforming reaction is stopped by first reducing reactor inlet temperatures and then halting hydrocarbon feed to the catalytic reactor system 100. Next, hydrocarbons are removed from the catalytic reactor system 100 via hydrogen stripping, followed by further reducing reactor inlet temperatures. The catalytic reactor system 100 may be purged with nitrogen. Hazardous substances present in reactor system 100 may be abated via a low temperature oxidation. The level of hazardous substances may be monitored and the oxidation controlled in response thereto. Furthermore, exotherms across the reactors may be controlled during the oxidation. The low temperature oxidation is continued until a desired (e.g., safe) level of the hazardous substances inside the catalytic reactor system 100 is obtained. Thereafter, the oxidation is stopped, and the catalytic reactor system 100 is allowed to cool and is opened and serviced. Optionally, the catalyst is removed from the catalytic reactor system. Upon completion of servicing, and reloading of catalyst if removed, the catalytic reactor system 100 is closed, and the catalytic reactor system 100 is started up.

Referring to FIG. 2, to stop the reforming reaction in the catalytic reactor system 100, the reactor inlet temperatures are first reduced at reactor inlets 70, 72, and 74 from about 925-950° F. to about 600-700° F. The heat sources (not shown) to furnaces 11, 21, and 31 are controlled to reduce the temperatures as desired, for example by shutting down the burners of respective furnaces 11, 21, and 31 as required. Once the temperatures at reactor inlets 70, 72, and 74 are about 700° F., the liquid hydrocarbon feed to the catalytic reactor system 100 may be halted.

After the feed has been halted, residual hydrogen from the reforming reactor system may be recycled via line 50 to flow through catalytic reactor system 100 to allow for stripping of at least a portion of hydrocarbons from the catalytic reactor system prior to beginning the oxidation. Alternatively, nitrogen could be used for stripping hydrocarbons. Reactor inlet temperatures at reactor inlets 70, 72, and 74 may continue to be maintained at about 700° F., and below 750° F., during hydrogen stripping. The catalytic reactor system 100 may gradually be depressured to about 15 psig, while maintaining about an 80% hydrogen recycle content. Hydrogen stripping may be continued for at least about 4 hours or until the rate of accumulation of liquids drops to below about 5 gallons/hour. Catalytic reactor system 100 may then be allowed to cool to reactor inlet temperatures of about 350° F. to about 500° F., alternatively to about 400° F. to about 425° F., at a rate of about 100° F. per hour by shutting down the burners of respective furnaces 11, 21, and 31 as required. Hydrogen stripping may be continued until the accumulation rate is less than 1 gallon/hour, at which point hydrocarbons may have adequately been stripped.

Catalytic reactor system 100 may then be purged of hydrocarbon liquids by pressurizing the system to about 15 psig using nitrogen. The nitrogen purge may be continued until a 98% nitrogen atmosphere in the catalytic reactor system 100 is attained as measured through gas analysis of recycle gas samples taken in line 50 (sample locations not shown in FIG. 2). Catalytic reactor system 100 may then be further pressurized to any effective pressure, alternatively less than about 150 psig, alternatively less than about 100 psig, alternatively less than about 60 psig, alternatively about 1 to 60 psig. During the pressurization, reactor inlet temperatures are monitored to avoid exceeding a temperature limit of about 400° F. to about 450° F.

At this point, abating the hazardous substances by an oxidation of the hazardous substances may begin in conjunction with monitoring for levels of the hazardous substances by taking samples with a sampling tube or other suitable sampling means, to be described more fully below. To oxidize, air may be injected into catalytic reactor system 100 via line 52 at a rate that is sufficiently low enough to control oxidation temperatures but that provides sufficient oxygen to begin oxidizing the hazardous substances, as well as other hydrocarbons present in the catalytic reactor system 100. In an embodiment, the air may be injected at a temperature of about 300-500° F. and at a rate such that the concentration of oxygen in the reactor system is maintained within any of the following mole % oxygen ranges; from about 0.005 to about 5 mol %, from about 0.01 to about 2 mol %, from about 0.1 to about 1 mol %, from about 0.25 to about 0.5 mol % oxygen. There may be a large exotherm across the first reactor 10 as hydrocarbons, including the hazardous substances, are oxidized across that reactor. The exotherm is monitored and maintained to below about 125° F. across all the reactors 10, 20, and 30 to avoid platinum sintering of the catalyst by reducing air injection to control/prevent an excessive exotherm, by reducing furnace temperatures, by injecting nitrogen, or combinations thereof. Most of the hydrocarbons, including the hazardous substances, may be oxidized in the first reactor 10. Therefore, oxygen breakthrough from reactor 10 may be monitored with on-line oxygen monitors at the inlet 70 and outlet 71. Once oxygen breakthrough has occurred, the hazardous substances may be nearly abated and more frequent monitoring for the hazardous substances may begin. The oxidizing is continued by continuing injection of air into the catalytic reactor system 100 at a rate such that the concentration of oxygen in the reactor system is maintained within any of the following mole % oxygen ranges; from about 0.005 to about 5 mol %, from about 0.01 to about 2 mol %, from about 0.1 to about 1 mol %, from about 0.25 to about 0.5 mol % oxygen while continuing to periodically monitor hazardous substances levels. Oxidizing the catalytic reactor system 100 continues in this manner and the oxidation may be controlled in response to the monitoring of the hazardous substances levels.

In FIG. 2, the level of hazardous substances in the catalytic reactor system 100 may be monitored during the oxidizing process by obtaining samples at various locations within the system. Samples can be withdrawn via any convenient piping or tubing in the catalytic reactor system 100, for example at an inlet or outlet of the reactors within the system; in the recycle line 50 such as inlet 56 or outlet 57 of a recycle drier 54 for removing water formed in the reforming reactor system; or other sample points throughout the system as desired. In an embodiment, the hazardous substances are monitored by collecting samples at the inlet 70 and outlet 71 of the first reactor 10 and at the outlet 75 of the last reactor 30. By analyzing samples at the outlet of the reactor system (e.g., the outlet 75 of the last reactor 30), the levels of hazardous substances throughout all the reactors 10, 20, and 30 in series can be monitored. By analyzing samples at the inlet of the reactor system (e.g., the inlet 70 of the first reactor 10), the levels of hazardous substances throughout the remainder of the process loop can be monitored. Each sample may be analyzed with a gas analyzer. Commercially available gas-detector tubes or chip-measurement systems, for example available by Gastec® or Dräger, may be used.

The oxidation of the hazardous substances proceeds until the hazardous substances are abated to a safe exposure level. As used herein, to abate the hazardous substances means to remove substantially all of the hazardous substances to concentrations at or below the levels for safe exposure as reported by the United States Occupational Safety & Health Administration (OSHA) or the American Conference of Governmental Industrial Hygienists (ACGIH®). In an embodiment, abating the hazardous substances may be by oxidizing the hazardous substances at a low temperature. In an embodiment, the hazardous substances (e.g., benzene) may be abated from the catalytic reactor system by oxidizing the hazardous substances at a temperature of equal to or greater than the decomposition temperature of the hazardous substances and less than the regeneration temperature of the catalyst, for example from about 350° F. to about 500° F., alternatively from about 400° F. to about 450° F. In an embodiment, the hazardous substances comprise benzene. In this embodiment, the oxidation proceeds until the benzene is abated to a safe exposure level of less than about 1.0 ppmv, the OSHA benzene permissible exposure limit (PEL) as measured on samples taken at the reactor system inlet and outlet locations. When the safe exposure level for the hazardous substances is obtained, the system pressure may be gradually reduced to about 15 psig to evolve any remaining hazardous substances that may be present in pockets within the system. Any additional hazardous substances that evolve, thus may be oxidized. Upon abating the hazardous substances to a safe exposure level, the oxidation may be stopped. The hazardous substances thus abated, the catalytic reactor system may now be transitioned to a non-active state and may be safe for exposure.

In an embodiment, to ensure the hazardous substances are abated, additional measurements or supplemental monitoring may optionally be conducted to check the level the hazardous substances immediately after opening the catalytic reactor system. Of course, such supplemental monitoring should be conducted in a manner (for example, through use of a self-contained breathing apparatus) that does not expose personnel to the hazardous substances in the event that an unacceptable level is detected.

The catalyst from reactor 10 may now be safely removed if desired for screening. If desired, other types of servicing of the reactor system may also be performed at this time. In an embodiment, the servicing procedure may involve removing spent catalyst from the catalytic reactor system 100. In this embodiment fresh catalyst may then be loaded into catalytic reactor system 100. In another embodiment, mechanical repair and maintenance work may be performed on and in the reactor system, furnace tubes, heat exchangers and all associated piping.

Starting up the catalytic reactor system 100 may involve activating the catalyst via known methods for activating catalysts.

The activity of the catalyst may be quantified in terms of an Equivalent Weighted Average Inlet Temperature (WAIT), or T-eq. As used herein, actual WAIT for the reactor system is the weighted average based on total weight of catalyst of all the actual measured inlet temperatures of the individual reactors comprising the catalytic reactor system 100. For example, if the inlet temperatures to reactors 10, 20, and 30 are 960°, 969°, and 973° F. and each reactor contains an equal amount of catalyst, the actual WAIT is (960+969+973)/3=967.3° F. As used herein, T-eq is the equivalent reactor weighted average inlet temperature (WAIT) that would be required to run a catalytic reforming reaction to a specified conversion at a standard set of reactor operating conditions such as hydrocarbon feed rate, recycle hydrogen-to-hydrocarbon molar ratio, average reactor pressure, and concentration of feed-convertible components. T-eq can either be established by running at standard conditions or by using a suitable correlation to estimate T-eq based on measured values of reactor variables. In an embodiment, the catalyst may have one or more cycles of catalyst activity. The "end-of-cycle T-eq" as used herein is defined as the equivalent temperature at the end of a catalyst activity cycle. Because the catalyst cannot be fully regenerated after each cycle (as shown in FIG. 1), its life is limited by a maximum number of economically useful cycles. The catalyst's end-of-life is when it reaches its end-of-cycle T-eq on the last cycle, also referred to herein as the "end-of-life T-eq".

In an embodiment, the servicing procedure of this disclosure may be used most economically for any servicing event that occurs at a time during the catalyst activity cycle that is not near the end of the cycle, for example when the activity of the catalyst before abatement as measured by T-eq is at least about 30° F. below the end-of-cycle T-eq, alternatively at least about 20° F. below the end-of-cycle T-eq. Alternatively, if the servicing event occurs near the end of an activity cycle (which is not the final activity cycle), for example within about 2 months of the end of the current activity cycle and/or the activity of the catalyst as measured by T-eq is not at least about 30° F. below the end-of-cycle T-eq, alternatively, is not at least about 20° F. below the end-of-cycle T-eq, it may be economically advantageous to regenerate the catalyst rather than perform an abatement procedure as described herein. Furthermore, if the servicing event occurs near the end of the catalyst's life (or final activity cycle), for example within about 2 months of the end of its life and/or the activity of the catalyst as measured by T-eq is not at least about 15 to 20° F. below the end-of-life T-eq, it may be more desirable to postpone abatement if possible until the final cycle is more fully complete, at which time a low temperature abatement process may be performed to safely remove the spent catalyst.

In an embodiment, the catalyst activity is substantially the same before and after the abatement as described herein. In an embodiment, the activity of the catalyst may temporarily increase (as evidenced by a decrease in T-eq post-abatement) for a period of about 1 month after the abatement. However, following this temporary increase the activity of the catalyst as measured by T-eq may return to within about 20° F. of the activity before the abatement; alternatively to within about 15° F. of the activity before the abatement; alternatively to within about 10° F. of the activity before the abatement.

The fouling rate as used herein is defined as the change in T-eq per week in a catalytic reforming process and can be used to measure the change in catalyst activity. By utilizing the method disclosed herein, to service a catalytic reactor system, hazardous substances may be abated from the catalytic reactor system while maintaining substantially the same fouling rate before and after the servicing. In an embodiment, the fouling rate may increase by no more than about 30% after the abatement; alternatively no more than about 25% after the abatement; alternatively no more than about 20% after the abatement.

The disclosed method of servicing a catalytic reactor system, comprising oxidizing a catalytic reactor system to abate hazardous substances from the catalytic reactor system may reduce servicing time by about 50%, alternatively by about 60%, alternatively by about 75%, of the time required for a complete regenerative oxidation of the catalytic reactor system. Previously completed regenerative oxidations took about 43 hours from oxygen introduction to cool down. This included a 24 hour hold to fully remove carbon. Excluding this hold, the time would be about 19 hours, about double the 9 hours for the example abatement process. This may be because the oxidation is stopped once a safe exposure level for benzene is obtained which requires a shorter period of time for the oxidizing than for a complete regenerative oxidation of the catalytic reactor system. Additionally, the oxidation is typically at a lower temperature than for a complete regenerative oxidation of the catalytic reactor system and therefore time is saved in the heating to oxidizing temperatures and also the reactor system cooling time is less than the cooling time required for a complete regenerative oxidation of the catalytic reactor system.

EXAMPLE

The method for servicing a catalytic reactor system by oxidizing hazardous substances having been generally described, the following example is given as a particular embodiment of the method disclosed and to demonstrate the practice and advantages thereof. It is understood that the examples are given by way of illustration and are not intended to limit the specification or the claims to follow in any manner.

Servicing a catalytic reactor system such as the one shown in FIG. 2 to dump and screen the catalyst in the first reactor 10 and to clean several key exchangers was performed following the method described above for abating hazardous substances to safe exposure levels. A low-temperature oxidation at a maximum of about 425° F. was performed according to the procedure described in this disclosure to remove the residual hazardous substances from the catalytic reactor system and preserve the catalyst activity in the remaining cycle for its use after servicing the catalytic reactor system. In this example, the hazardous substances comprise benzene and the catalytic reactor system utilizes a readily available platinum catalyst useful for reforming naphthenes to aromatics.

Periodic sampling of the catalytic reactor system for benzene was performed to determine when the abatement of the benzene could be considered complete. Sample stations for the catalytic reactor system included sample points for the first reactor inlet and outlet and the last reactor outlet. These sample points, along with drier inlet and outlet sample points were used to monitor the change in benzene concentrations in the catalytic reactor system as the oxidation progressed.

Two types of benzene monitors were used for taking benzene measurements. The first was a Gastec® pump with a type 121 benzene detector tube. The other monitor was an electronic Dräger instrument used for measurements below 5 ppmv benzene. The results for the benzene monitoring sampling data are tabulated in Table 1 below.

TABLE 1

| | Computer Readings | | | | | Benzene Analyses, ppmv | | | | | |
|---|---|---|---|---|---|---|---|---|---|---|---|
| | | Temp. diff. across first reactor inlet 10 | First reactor inlet 70 | Last reactor outlet 75 | | First reactor inlet 70 | | First reactor outlet 71 | | Last reactor outlet 75 | |
| Start Time | First reactor Inlet Temp F. | F. | % O2 | % O2 | Comments | Tube[1] | Elec[2] | Tube[1] | Elec[2] | Tube[1] | Elec[2] |
| 15:00 | 425 | 1 | | | | | | 60 | | | |
| 16:30 | 416 | 3 | −0.06 | −0.07 | Start O$_2$ | | | | | | |
| 16:45 | 419 | −26 | 0.25 | −0.07 | | | | | | | |
| 16:52 | 419 | −38 | 0.18 | −0.05 | | | | 60 | | | |
| 16:56 | 419 | −58 | 0.24 | −0.02 | | 8 | | | | | |
| 17:05 | 420 | −71 | 0.22 | −0.05 | | | | 24 | | | |
| 17:09 | 420 | −71 | 0.22 | −0.05 | | 8 | | | | | |
| 17:13 | 422 | −72 | 0.22 | −0.07 | | | | | | 60 | |
| 17:15 | 424 | −73 | 0.25 | −0.04 | | | | 10 | | | |
| 17:18 | 424 | −73 | 0.25 | −0.04 | | | | | | 60 | |
| 17:26 | 423 | −78 | 0.24 | −0.07 | | | | 6 | | | |
| 17:45 | 424 | −65 | 0.24 | −0.07 | | | | <5 | | | |
| 17:58 | 425 | −48 | 0.25 | −0.04 | | 80 | | | | 120 | |
| 18:01 | 425 | −46 | 0.25 | 0.03 | | | | | 6.7 | | |
| 18:04 | 425 | −46 | 0.25 | 0.03 | | | | | 6.2 | | |
| 18:23 | 425 | −53 | 0.27 | 0.03 | | | | | | >120 | |
| 18:24 | 425 | −53 | 0.27 | 0.03 | | | | | | 220[3] | |
| 18:55 | 426 | −70 | 0.90 | 0.47 | O$_2$ breakthru | | | | | | |
| 19:35 | 425 | −12 | 0.39 | 0.35 | | 34 | | | | | |
| 19:38 | 425 | −12 | 0.39 | 0.35 | | | | <5 | | | |
| 19:40 | 424 | −11 | 0.46 | 0.44 | | | | | | <5 | |
| 20:15 | 420 | −7 | 0.63 | 0.61 | | | | <5 | | | |
| 20:25 | 417 | −6 | 0.49 | 0.44 | | | | | 0.72 | | |
| 20:28 | 417 | −6 | 0.49 | 0.44 | | 10 | | | | | |
| 20:29 | 417 | −6 | 0.49 | 0.44 | | | | | | <5 | |
| 20:33 | 417 | −6 | 0.41 | 0.39 | | | | | | | 1.91 |
| 21:50 | 415 | −2 | 0.65 | 0.62 | | 6 | | | | | |
| 21:52 | 415 | −2 | 0.65 | 0.62 | | | >10 | | | | |
| 22:55 | 413 | −2 | 0.78 | 0.78 | Bypass drier | | | | | | |
| 23:14 | 412 | −1 | 0.79 | 0.77 | | | <0.2 | | | | |
| 23:20 | 412 | 0 | 0.79 | 0.77 | | | <0.2 | | | | |
| 23:30 | 411 | −2 | 0.77 | 0.75 | Reduce P | | | | | 0.52 | |
| 0:22 | 433 | 5 | 0.27 | 0.22 | | | | | | 0.56 | |
| 0:28 | 418 | −11 | 0.22 | 0.19 | | | | | 1.37 | | |
| 1:00 | 431 | 8 | 0.40 | 0.37 | | | | | <0.2 | | |
| 1:05 | 425 | −1 | 0.49 | 0.44 | | <5 | | | | | |
| 1:20 | 382 | −36 | 0.68 | 0.65 | Cut Temps | | | <5 | | | |
| 1:55 | 310 | −9 | 0.58 | 0.55 | | | | | <0.2 | | |
| 2:00 | 307 | −8 | 0.55 | 0.52 | | | 0.4 | | | | |
| 2:06 | 304 | −8 | 0.51 | 0.48 | | | | | | | <0.2 |

[1] Tube = Gastec ® tube
[2] Elec = Dräger electronic instrument measurement
[3] using ½ pull As can be seen in Table 1, the initial sample for the first reactor outlet before the oxidation started was 60 ppmv. About 30 minutes after the air was introduced, this began to drop. It was about 7 ppmv after 2.5 hours. Once the oxygen broke through the reactor, signaling a decline in the hydrocarbon oxidation part of the burn, the level dropped to less than about 1 ppmv and remained there. The initial sample for the last reactor outlet also was about 60 ppmv but it increased during the hydrocarbon oxidation. Once the oxygen broke through the first reactor, the levels dropped and eventually reached less than 1 ppmv. The initial sample for the first reactor inlet started at 8 ppmv and then increased to 80 ppmv before eventually dropping to less than 1 ppmv.

Initially, the catalytic reactor system contains low levels of benzene, even after the normal hydrogen stripping. Once the air is started, hydrocarbon, including benzene, begins to oxidize across the first reactor. Since the oxygen is limited, at least a portion of the hydrocarbon does not oxidize. The benzene in the downstream reactors will not decrease until oxygen breaks through the first reactor. The slight increase in measured benzene in the last reactor outlet may have been a transient response coming from the upstream reactors. The time from the start of the oxygen injection to oxygen breakthrough was about 2 hours. It took about another 4 hours of oxidizing to obtain benzene levels for first reactor inlet of below about 1 ppmv.

Two additional benzene measurements were taken during the dump of the first reactor, both by lowering an electronic Dräger monitor into the reactor. The first measurement was taken near the top of the reactor. The benzene level was less than 0.2 ppmv. The second measurement was taken just above the catalyst after about ⅔ of the catalyst had been dumped and after the pie plates had been removed. The measurements indicated that the low-temperature oxidation successfully cleaned up the catalytic reactor system from benzene contamination to levels below the OSHA standard of 1 ppmv.

Measurement was made of catalyst activity before and after the low-temperature oxidation to determine whether the catalyst activity changed significantly. To determine this, a measure of the activity was made using the Equivalent Weighted Average Inlet Temperature (WAIT), or T-eq, that was calculated by using the measured flow rates, pressures, and actual reactor inlet temperatures for estimating the catalytic reactor inlet temperatures necessary to run at a specified full-rate, full-conversion condition. The normalization was done using a kinetic model for the reaction.

Figure 3:
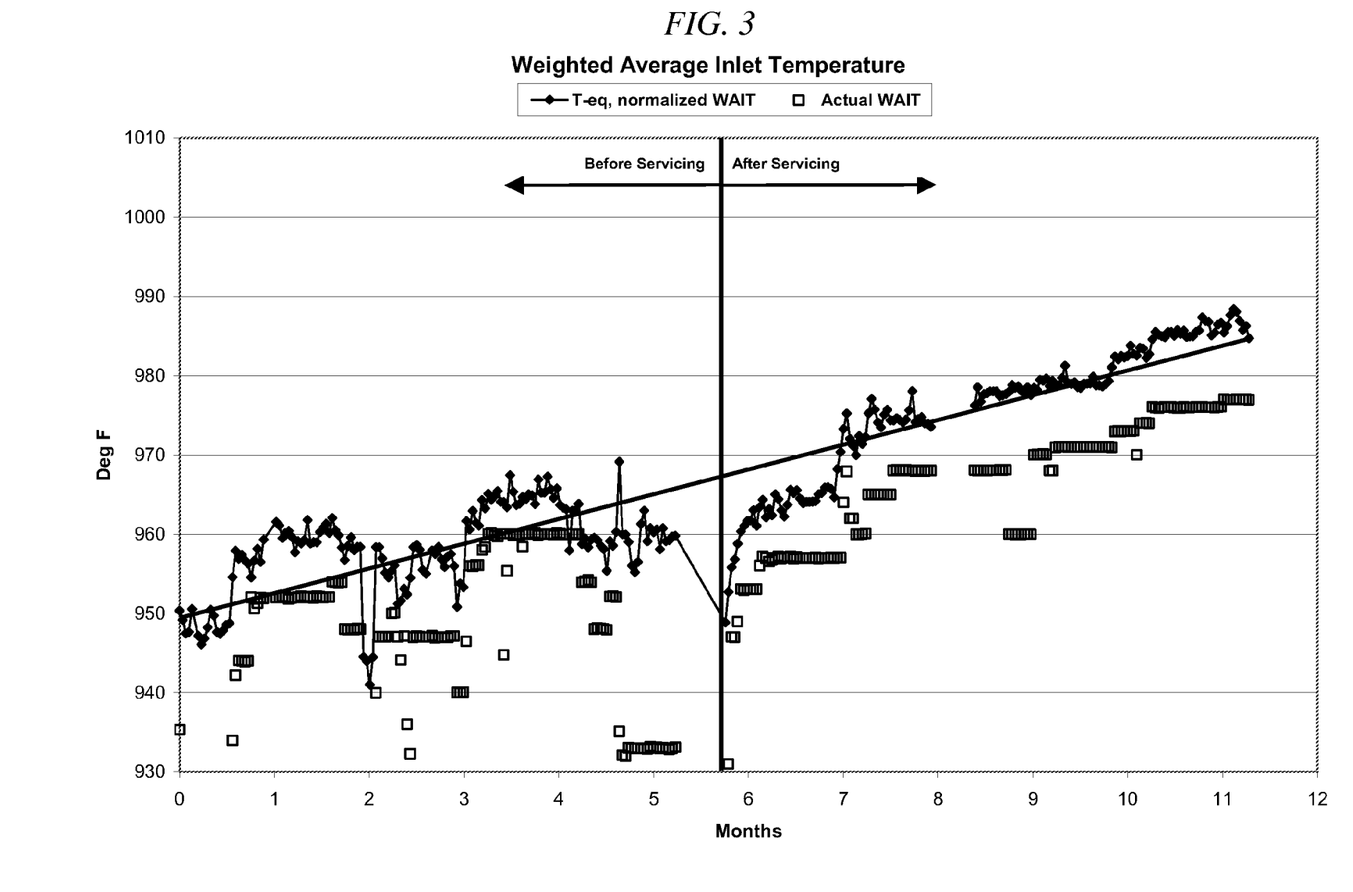
FIG. 3 is a graph representing catalyst activity measured as Weighted-Average Inlet Temperature (WAIT) before and after abating hazardous substances from a catalytic reactor system according to the present disclosure.

The results are shown in FIG. 3 and include the equivalent normalized data (T-eq) as well as actual data. Within the scatter of the equivalent normalized data it can be seen that the catalyst activity did not significantly change after the low-temperature oxidation. Also, the catalyst-fouling rate, as shown by the slope of the data, did not change significantly and is about the same as before the low-temperature oxidation.

The example demonstrates that the low-temperature oxidation of the catalytic reactor system successfully removed the residual benzene in the catalytic reactor system and did not significantly change the catalyst's activity.

In the description above, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present disclosure is susceptible to embodiments of different forms. There are shown in the drawings, and herein are described in detail, specific embodiments of the present disclosure with the understanding that the present disclosure is to be considered an exemplification of the principles of the invention, and is not intended to limit the invention to that illustrated and described herein. Specifically, the present disclosure for a method of servicing a catalytic reactor system should not be limited by any of the various embodiments described. The method disclosed herein is for servicing a catalytic reactor system and may be useful in any suitable reactor system such that the reactor system is a catalytic reactor system. In an embodiment, the method of the present disclosure is for a catalytic reforming reactor system for the conversion of naphthas and the detailed description above may be focused on this embodiment but with the understanding that the present invention may have broader applications.

What we claim as our invention is:

1. A method comprising:
   operating a process using a catalytic reactor system comprising a catalyst, whereby the process produces at least one hazardous substance;
   discontinuing operation of the process; and
   abating the at least one hazardous substance from the catalytic reactor system while preserving activity of the catalyst contained therein.

2. The method of claim 1, wherein the abatement comprises an oxidation of the at least one hazardous substance.

3. The method of claim 2, wherein the oxidation of the at least one hazardous substance occurs at a temperature of from about 350° F. to about 500° F.

4. The method of claim 1, wherein the at least one hazardous substance is abated to a safe exposure level.

5. The method of claim 1, wherein the at least one hazardous substance comprises benzene.

6. The method of claim 2, further comprising monitoring an amount of the at least one hazardous substance and controlling the oxidation of the at least one hazardous substance in response thereto.

7. The method of claim 6, wherein the monitoring the at least one hazardous substance further comprises obtaining samples at an inlet and an outlet of the catalytic reactor system.

8. The method of claim 6, wherein the at least one hazardous substance is abated to a safe exposure level.

9. The method of claim 6, wherein the at least one hazardous substance comprises benzene, and the benzene is abated to an amount less than about 1 ppmv.

10. The method of claim 1, wherein the catalyst activity is substantially the same before and after the abatement.

11. The method of claim 10, wherein the catalyst activity as measured by T-eq after the abatement is within about 20° F. of the catalyst activity before the abatement.

12. The method of claim 1, wherein the catalyst activity as measured by T-eq before the abatement is at least about 30° F. below an end-of-cycle T-eq.

13. The method of claim 1, wherein a fouling rate as measured by change in T-eq per week increases by no more than about 30% after the abatement.

14. The method of claim 1, wherein the catalytic reactor system is a fixed bed reactor system.

15. The method of claim 1, wherein the catalytic reactor system is a reforming reactor system.

16. The method of claim 15, wherein the reforming reactor system comprises a plurality of reactors.

17. The method of claim 1, wherein the catalyst is a reforming catalyst.

18. The method of claim 1, wherein the catalyst is a platinum catalyst.

19. The method of claim 1, wherein the catalyst has one or more cycles of catalyst activity.

20. The method of claim 1, further comprising dumping and screening the catalyst subsequent to abating.

21. The method of claim 1, further comprising replacing the catalyst subsequent to abating.

22. The method of claim 21, further comprising reclaiming metal from the catalyst.

23. The method of claim 20, further comprising reloading the catalyst subsequent to dumping and screening.

24. A method comprising:
   oxidizing a catalytic reactor system at a temperature of from about 350° F. to about 500° F. to abate at least one hazardous substance from the catalytic reactor system, wherein a time required to perform the oxidation is at least about 50% less than a time required for complete regenerative oxidation of the catalytic reactor system.

25. The method of claim 24, wherein the at least one hazardous substance is abated to a safe exposure level.

26. A method comprising:
   operating a process using a catalytic reactor system comprising a catalyst, whereby the process produces at least one hazardous substance;
   discontinuing operation of the process;
   abating the at least one hazardous substance from the catalytic reactor system such that a fouling rate of the catalyst is substantially the same before and after the abating; and
   restarting operation of the process using the catalyst.

27. A method comprising:
   oxidizing a catalytic reactor system at a temperature of from about 350° F. to about 500° F.;
   monitoring abatement of at least one hazardous substance within the catalytic reactor system; and
   controlling the oxidation in response to the monitoring such that an activity of a catalyst contained therein as measured by T-eq after the oxidizing is within about 20°

F. of the catalyst activity before the oxidizing and the at least one hazardous substance is oxidized to a safe exposure level.

28. The method of claim 27, wherein the oxidation is stopped before regenerating the catalyst in order to preserve catalyst life.

29. The method of claim 8, further comprising gradually reducing the system pressure to about 15 psig to evolve any remaining hazardous substances, wherein the system pressure is reduced after the at least some of the hazardous substance is abated to a safe exposure level.

30. The method of claim 1, further comprising: regenerating the catalyst subsequent to abating.

31. The method of claim 1, further comprising: removing hydrocarbons from the catalytic reactor system subsequent to discontinuing and prior to abating.

32. The method of claim 1, wherein the oxygen concentration in the catalytic reactor system during the abating is from about 0.005 mol % to about 5 mol %.

33. The method of claim 1, further comprising: restarting operation of the process using the catalyst.

* * * * *